United States Patent [19]
Bryant et al.

[11] Patent Number: 5,490,475
[45] Date of Patent: Feb. 13, 1996

[54] MAXIMUM TEMPERATURE INDICATOR

[75] Inventors: Edward W. S. Bryant; Burton T. Mackenzie, both of Lawrence, Kans.

[73] Assignee: Camco International Inc., Houston, Tex.

[21] Appl. No.: 187,688

[22] Filed: Jan. 26, 1994

[51] Int. Cl.[6] ............................ G01K 1/14; G01K 11/00; G01K 11/06
[52] U.S. Cl. ..................... 116/217; 374/160; 374/161; 252/962
[58] Field of Search ................................ 374/104, 159, 374/160, 161; 116/206, 216, 217; 252/962

[56]  References Cited

U.S. PATENT DOCUMENTS

| | | |
|---|---|---|
| 3,415,122 | 12/1968 | Yee . |
| 3,472,074 | 10/1969 | Glang et al. . |
| 3,802,269 | 4/1974 | Cooper . |
| 3,839,898 | 10/1974 | Talboom, Jr. et al. . |
| 4,064,872 | 12/1977 | Caplan ..................................... 374/162 |
| 4,215,208 | 7/1980 | Yee et al. ................................. 116/216 |
| 4,235,108 | 11/1980 | Patel ........................................ 116/207 |
| 4,272,988 | 6/1981 | Phillips et al. . |
| 4,278,349 | 7/1981 | Sander ..................................... 374/162 |
| 4,293,435 | 10/1981 | Portugall et al. ........................ 374/161 |
| 4,390,291 | 6/1983 | Gaven, Jr. et al. ...................... 374/160 |
| 4,749,856 | 6/1988 | Walker et al. ........................... 374/161 |
| 4,788,151 | 11/1988 | Preziosi et al. ......................... 116/217 |
| 5,052,820 | 10/1991 | McGinniss et al. .................... 252/962 |
| 5,152,611 | 10/1992 | Pieper et al. ............................ 374/160 |
| 5,254,473 | 10/1993 | Patel ........................................ 116/216 |

Primary Examiner—Diego F. F. Gutierrez

[57]  ABSTRACT

A maximum temperature indicator comprises a body of inexpensive and highly durable polymeric material adapted to be affixed to a support, such as within a mechanical device. The polymeric material undergoes a detectable physical change unique to a maximum temperature to which the polymeric material was exposed. After exposure, the polymeric material is easily tested to accurately determine the maximum temperature that the sample was exposed to.

8 Claims, 5 Drawing Sheets

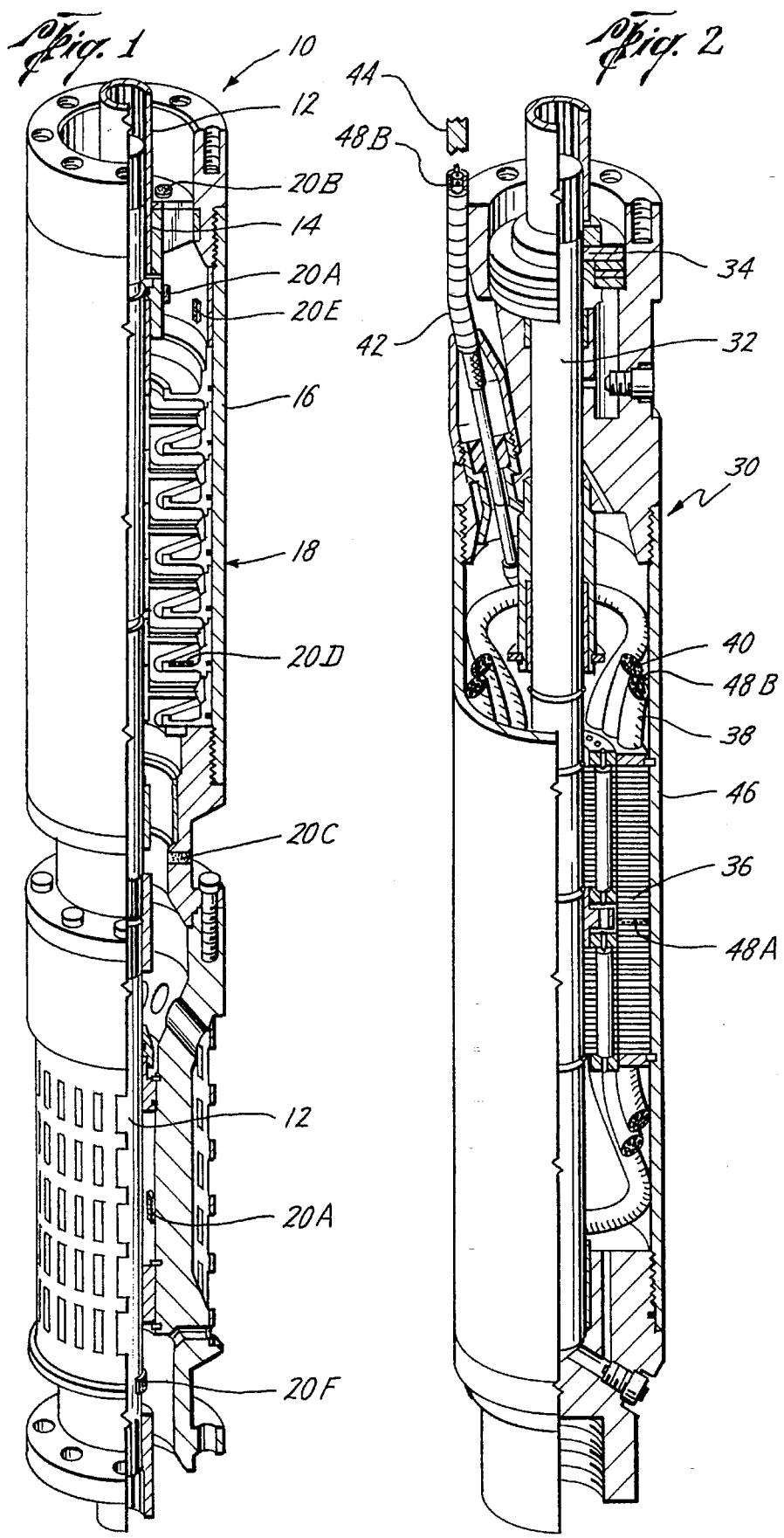

MAXIMUM TEMPERATURE INDICATOR

BACKGROUND OF THE INVENTION

1. Field of the Invention

The present invention relates to devices and related methods for determining the maximum temperature to which a temperature indicator was exposed and, more particularly, to devices and related methods wherein the temperature indicator comprises a body of polymeric material.

2. Description of Related Art

An industrial science called "Failure Analysis" has been developed over the years to determine after the fact what has caused the failure of a complex mechanical or electrical device. An important part of Failure Analysis is looking for indications of a portion of the device being exposed to temperatures that exceed its design limits. These indications can be physical and/or chemical changes in the device's materials which can be detected by smell, by microscopic analysis, by chemical analysis, by X-ray diffraction, and the like, as well as by operating temperature recordings, if available. There is a need in all of these methods for determining the exposure temperatures as quickly, as accurately, and as inexpensively as possible.

Many mechanical devices are used in environments where electromechanical temperature indicators, such as thermocouples and gauges that generate a signal representative of temperature, cannot be used due to space limitations, exposure to extreme temperatures, pressures and corrosive chemicals, and cost. For example, electromechanical temperature indicators usually cannot be used within chemical process equipment and within subterranean wellbores. So, when a failure occurs within a pump, motor, turbine, valve or drill bit used in these environments, a costly and time consuming Failure Analysis must be performed. This Failure Analysis could be performed more quickly and less expensively if some indicator could be developed and used which could remain part of the device but record the maximum temperature to which the device was exposed.

Another problem with prior electromechanical temperature indicators is that a single thermocouple can only indicate the operating temperature of a certain portion of the device adjacent which the thermocouple is located. While the portion of the device where the thermocouple may be located is operating at a temperature that is satisfactory, an adjacent portion of the device may be overheating. For example, a thermocouple can indicate that the oil or coolant temperature of an internal combustion engine is satisfactory, yet the temperature of one of the main bearings may be excessive.

Prior maximum temperature indicators included expensive and difficult to manufacture films or coatings that could be applied directly to the article to be investigated. Such prior indicators are disclosed in U.S. Pat. Nos. 3,415,122; 3,472,074; 3,839,898; and 4,272,988.

A prior maximum temperature indicator that was developed to meet some of the above described needs comprises a plurality of resin bodies which are attached on or within a device, with each such resin body being formed from a material with a different melting point. Examples of these prior indicators are disclosed in U.S. Pat. Nos. 3,802,269 and 4,390,291. When the device is exposed to a temperature that exceeds the melting points of particular bodies, upon inspection the operator can easily determine which bodies have melted and which bodies have not in order to determine the approximate maximum temperature to which the device was exposed. While these bodies provide a relatively inexpensive temperature indicator, the bodies cannot be used in devices where melted material might foul the operation of the device or undergo chemical attack, nor in very confined spaces within certain devices. Additionally, the bodies can only provide an approximation of the maximum exposure temperature, with the approximation dependant upon the number of bodies used and the difference in melting temperature of one body to the next.

There is a need for an inexpensive maximum temperature indicator which can be used in hostile environments, in confined spaces, and which can provide an indication of the exact temperature to which the device was exposed.

SUMMARY OF THE INVENTION

The present invention has been developed to overcome the foregoing problems and meet the above described needs. The present invention is a maximum temperature indicator comprising a body of polymeric material adapted to be affixed to a support, such as within a mechanical device. The polymeric material undergoes a detectable physical change unique to a maximum temperature to which the polymeric material was exposed. The polymeric material does not need to melt to provide such indication, and it can be formed in relatively thin sheets or strips for insertion into or placement immediately adjacent almost any portion of a mechanical device.

In one preferred embodiment of the present invention, the body of polymeric material is formed from a crystalline polyketone that undergoes a detectable physical change comprising the formation of crystalline structures unique to the maximum exposure temperature. The maximum exposure temperature is determined by measuring the amount of energy required to heat a portion of the polymeric material at a controlled rate. Any change in the required energy is detected between the polymeric material's glass transition temperature and melting temperature, and this detected change is then correlated to the maximum exposure temperature.

BRIEF DESCRIPTION OF THE DRAWINGS

FIG. 1 is a partial cut-away, elevational view of a centrifugal pump with maximum temperature indicators installed therein in accordance with the present invention.

FIG. 2 is a partial cut-away, elevational view of an elongated electric motor with maximum temperature indicators installed therein in accordance with the present invention.

DETAILED DESCRIPTION OF THE PREFERRED EMBODIMENTS

Figure 3:
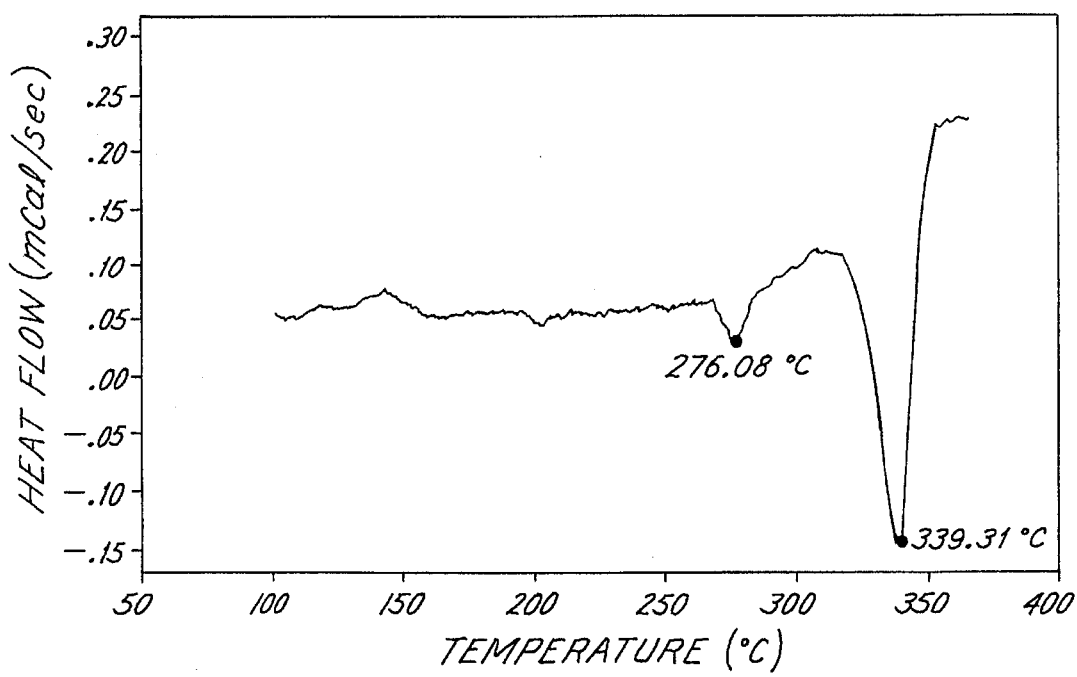
FIG. 3 is a graph of the maximum temperature to which a body of polymeric material was exposed in an air environment vs. melting temperature associated with the physical change of the polymeric material.
Figure 4:
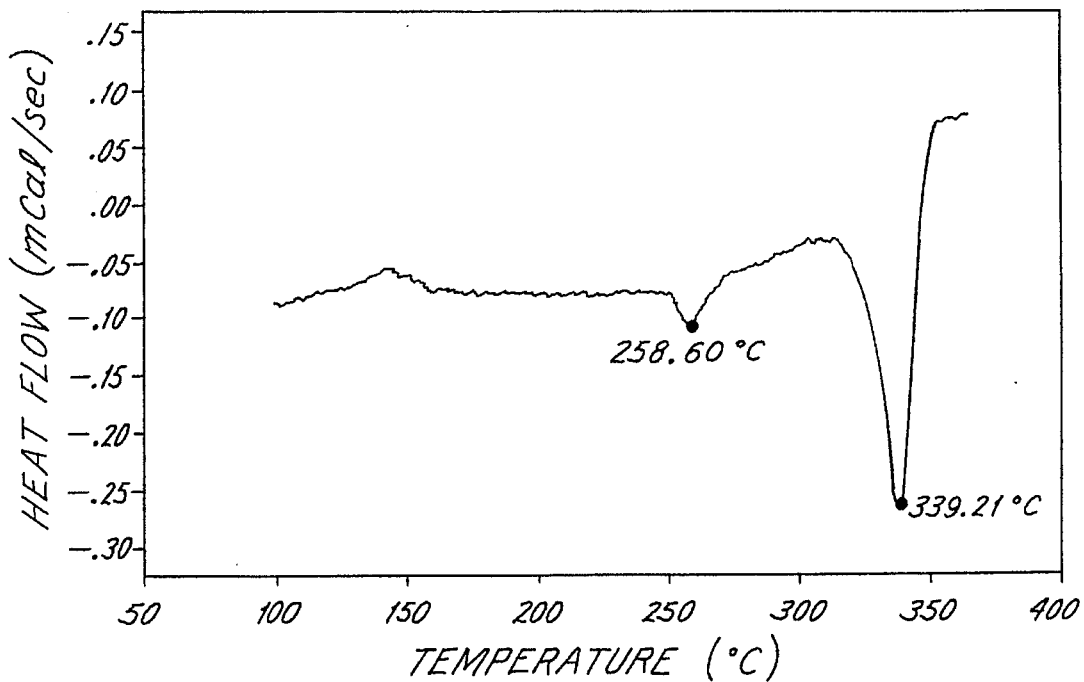
FIGS. 4–9 are graphs from a Differential Scanning Calorimeter of heat flow vs. temperature for samples of polymeric material exposed to different maximum temperatures.
Figure 5:
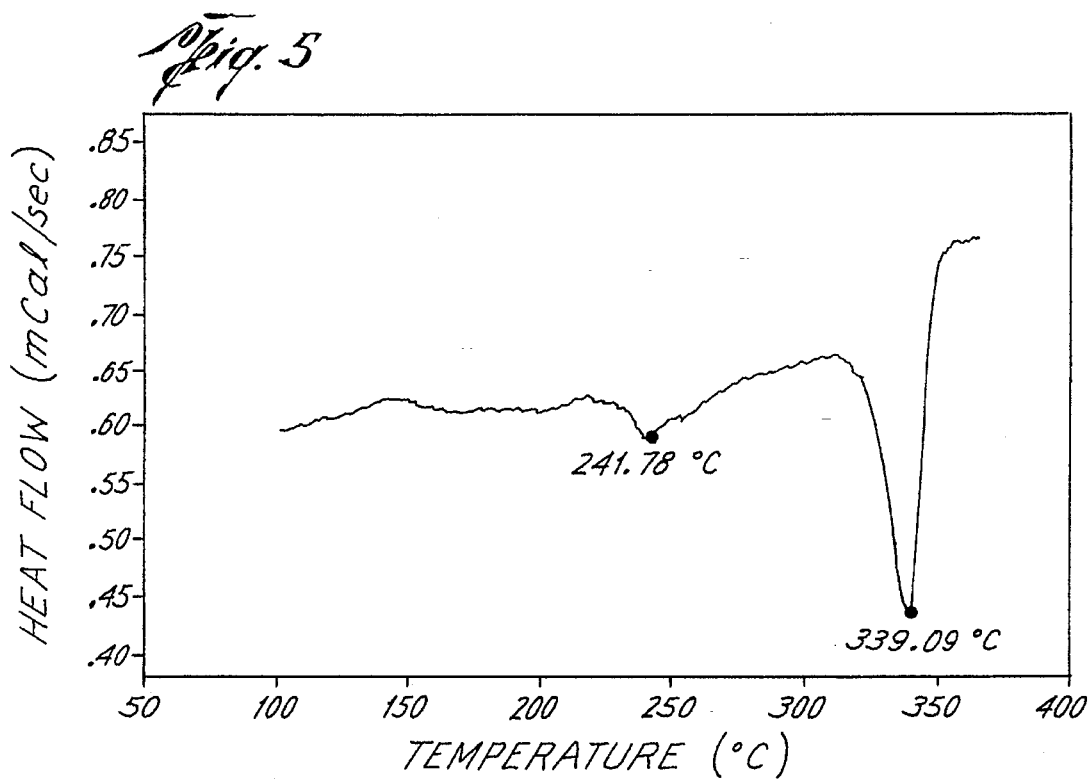
Figure 6:
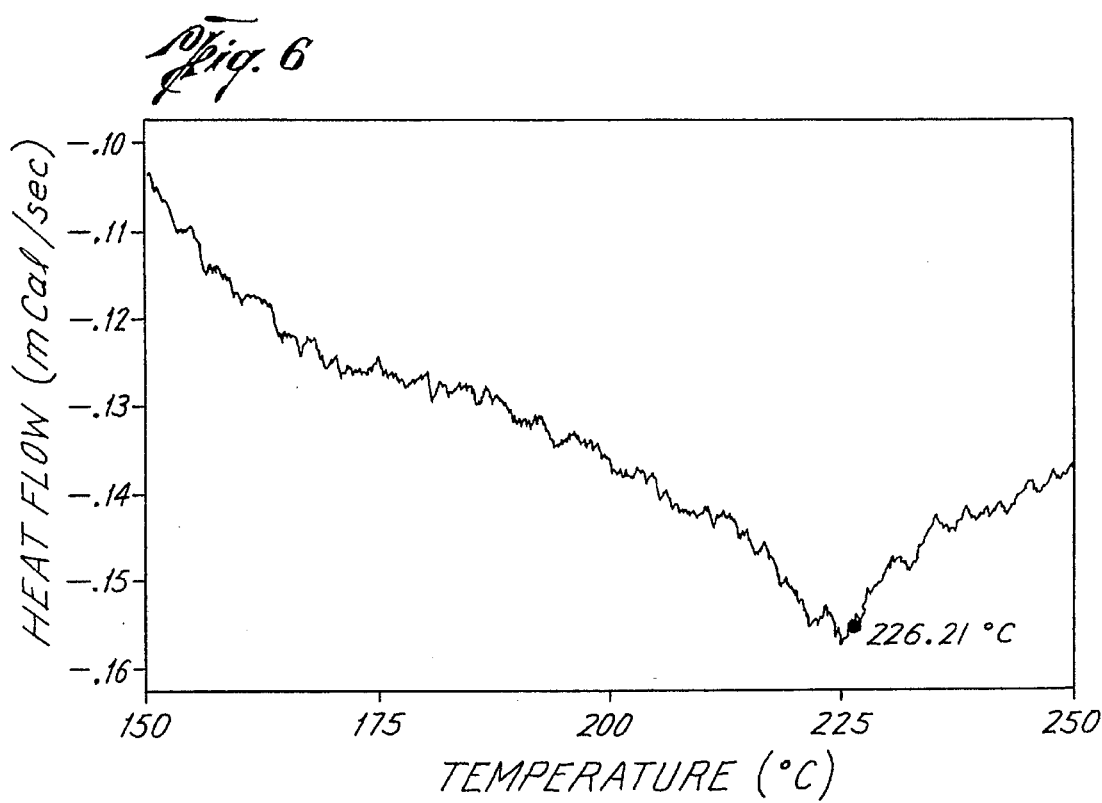
Figure 7:
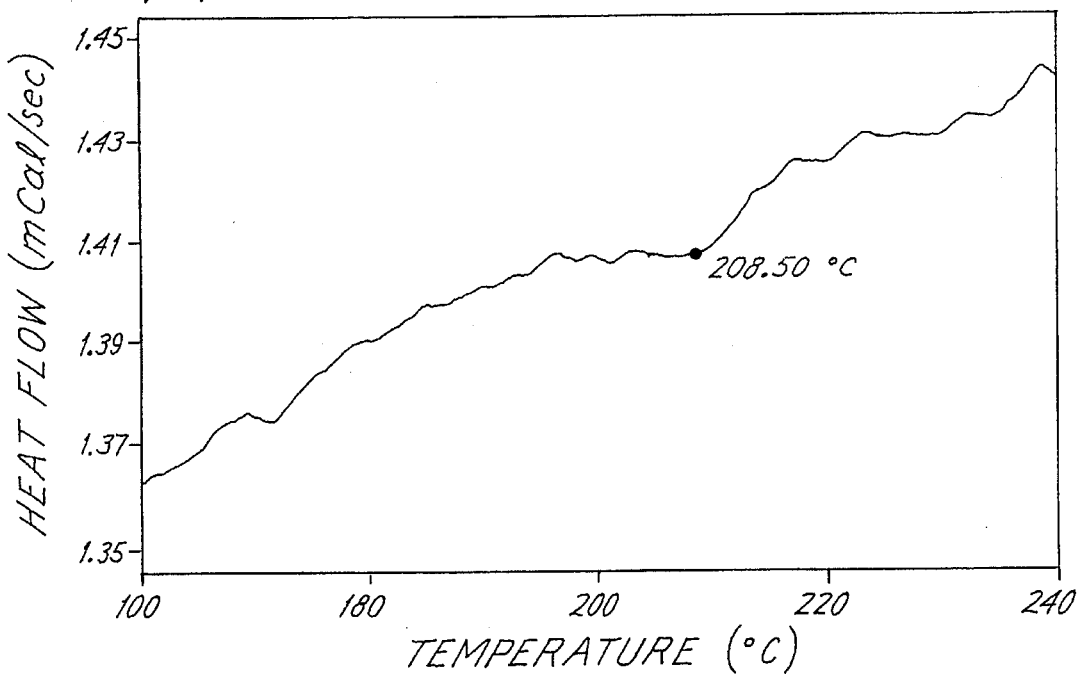
Figure 8:
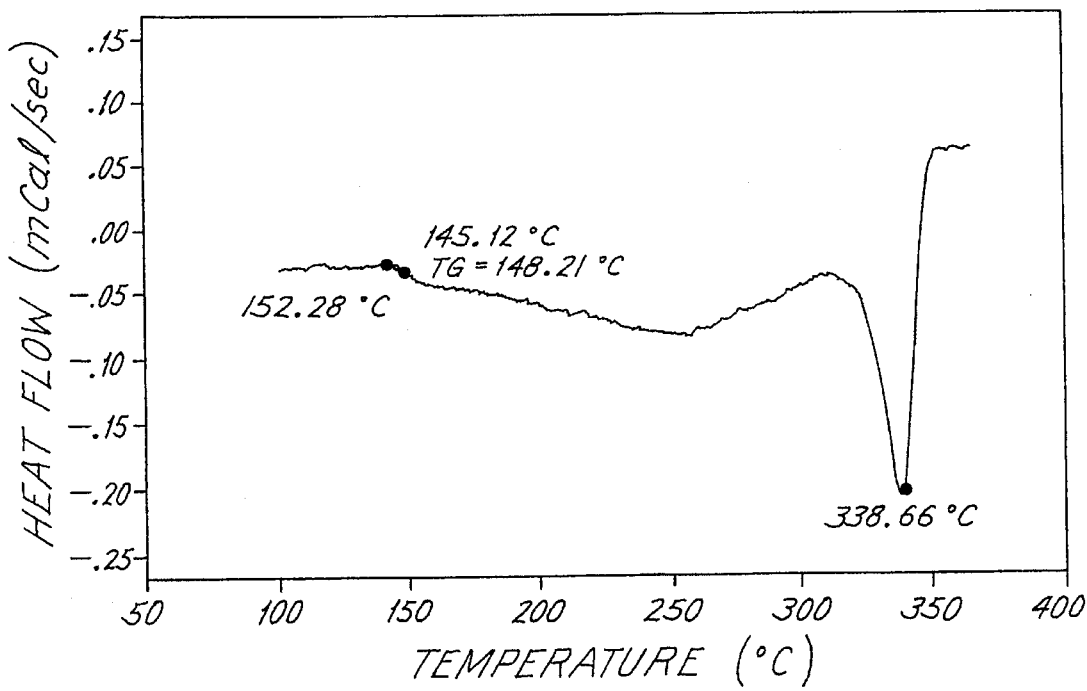

As described above, the present invention comprising a maximum temperature indicator and related methods for determining the maximum temperature to which a body of polymeric material was exposed. More specifically, the body of polymeric material undergoes a detectable physical change unique to the maximum exposure temperature, as long as this maximum exposure temperature is between the glass transition temperature and the melting temperature.

As used herein, the term "maximum temperature indicator" means any device, item of manufacture and/or material that changes in some detectable manner unique to the temperature to which it was exposed. This change can be physical, chemical or both, and can be detectable by human sight, human smell, human touch, and/or only by assistance from electrical, chemical, radiation investigative devices and the like. Further, while the term "maximum" temperature is used herein, it should be understood that the temperature indicator of the present invention can indicate any intermediate temperature to which it was exposed, as is desired.

As used herein, the term "support" means any suitable physical carrying or restraining structure, device or fluid to which the maximum temperature indicator can be operatively associated with. Specifically, the maximum temperature indicator of the present invention can be affixed into, within, on or adjacent to mechanical devices, items of manufacture, electrical devices, and within fluids. More specifically, the maximum temperature indicator can be formed as a functional part of a device, such as a cable tie, a wire, a wrapping material, a bearing, a panel, a plug, or the like. The maximum temperature indicator can be formed as a separate body that is glued, mechanically attached, or press fitted onto the exterior, within the interior, or in and on both the interior and exterior of any device, item of manufacture, etc. as desired. Further, the maximum temperature indicator can be formed as particles, flakes or spheres that are sprinkled or placed into and/or on a device in a pattern or randomly. These particles, flakes or spheres can be added to material mixtures, such as certain plastic and rubber compounds, and fluids. Likewise, the maximum temperature indicator can be formed as a coating or relatively thin sheet that can be brushed, sprayed or otherwise applied to a suitable support.

As an example, the insulative coating on a cable to be used in a subterranean wellbore can be made from the desired polymeric material. When the cable is removed from the wellbore, samples can be taken from given intervals, such as every three (3) feet, of the cable. When the results are plotted of the correlation between the physical change and the maximum exposure temperature, a temperature profile by wellbore depth can be created.

Since the maximum temperature indicator can be used in so many differing applications, for clarity sake and not by way of limitation, this discussion will focus on the use of the maximum temperature indicator within a mechanical device having rotating parts. Specifically, the maximum temperature indicator will be discussed in reference to drill bits, engines, valves, pumps, motors, turbines, and compressors. More specifically, the maximum temperature indicator will be used with an electric submergible pumping system, which generally comprises an elongated electric motor, a multi-stage centrifugal pump, and a length of power cable.

One preferred application of the maximum temperature indicator of the present invention is shown in FIG. 1, wherein a multi-stage pump 10 includes a central longitudinal shaft 12 rotatably connected through bearings 14 to an outer housing 16, and a plurality of pump stages 18. One or more films, sheets and bodies 20 of polymeric material are used as the maximum temperature indicator in accordance with the present invention, with such bodies being sized and shaped as desired to be bonded, glued and/or mechanically attached as 20A to an interior wall of the housing 16 adjacent one or more of the bearings 14, as 20B on or within one or more of the bearings 14, as 20C into a bore extending through the housing 16, as 20D on or within one or more pump stages, as 20E on the exterior of the housing 16, and as 20F on or within the shaft 12.

Another preferred application of the maximum temperature indicator of the present invention is shown in FIG. 2, wherein an elongated electric motor 30 includes a central, longitudinal shaft 32 rotatably connected through bearings 34, a plurality of laminations 36, motor windings 38 formed from coated wires 40, a motor lead extension 42 for interconnection with a power cable 44, and an exterior housing 46. One or more films, sheets and bodies of polymeric material are included in the motor's shaft 32, bearings 34 and housing 46 in like manner as described above with reference to the pump 10. Additionally, films, sheets and bodies of the polymeric material are sized and shaped as desired to be bonded, glued, and/or mechanically attached as 48A to the laminations 36, and as 48B to the interior and/or exterior of the motor windings 38, wires 40, motor lead extension 42, and the power cable 44. Preferably, and as will be discussed in detail hereinbelow, the polymeric material is used in an insulative coating on the wires 40 that make up the motor windings 38, the motor lead extension 42 and the power cable 44.

The maximum temperature indicator is preferably comprised of a material that undergoes a detectable physical change unique to a maximum temperature to which the polymeric material was exposed. A suitable material that can be used in all of the ways, configurations, etc. as set forth in the preceding paragraphs is a polymeric material, such as a polyketone, because it exhibits suitable electrical characteristics, abrasion resistance, resistance to chemicals, and has a melting temperature sufficiently high enough that it can be used in a subterranean wellbore environment.

Most polyketones are suitable, including polyethyleneterephthalate (PET), polyetherketone (PEK), polyetheretherketone (PEEK), polyetherketoneketone (PEKK) and polyetherketoneetherketoneketone (PEKEKK). However, the inventor hereof has found that polyetheretherketone (PEEK) is preferable, and a crystalline form of polyetheretherketone (PEEK) is most preferred. The most preferable crystalline form of polyetheretherketone (PEEK) is made using the methods disclosed in U.S. Pat. No. 5,260,104, which is commonly assigned hereto and is herein incorporated by reference.

The preferred crystalline polyetheretherketone (PEEK) undergoes a detectable physical change when exposed to a temperature between its glass transition temperature, about 143 degrees C, and its melting temperature, about 334 degrees C. This physical change is believed to be the formation of imperfect or smaller crystals that have a melting temperature different from the melting temperature of the generally uniform crystalline structure of the polyetheretherketone (PEEK). This physical change is not detectable by human sight, human touch, nor human smell, which can be beneficial in matters of criminal investigations, secrecy, and verification of warranty claims and Failure Analysis. This physical change may be detected using Electrical Resistance Measurements, X-ray Diffraction, Polarized Light Analysis, and is definitely detected using methods that detect changes of state of a material. Such preferred methods include the well know methods of Dynamic Mechanical Thermal Analysis (DMTA), Dynamic Electrical Thermal Analysis (DETA), and most preferred, because of low cost and ease of operation, Differential Scanning Calorimetry (DSC).

To better explain how the maximum temperature indicator is used in one preferred embodiment, the following illustrative discussion is provided. During the manufacture and/or at least prior to installation of an ESP within a wellbore, the desired films, sheets and/or bodies of the polymeric material are installed on the pump 10 and the motor 30, as described above. The pump 10 and motor 30 are operatively connected to form an electric submergible pumping system (ESP), such as the type made and marketed by the Reda Division of Camco International Inc. The ESP is lowered into a subterranean wellbore and is operatively connected through the power cable 44 to a surface source of electrical power.

After a failure or at any desired time, the ESP is removed from the subterranean wellbore and is disassembled for inspection. If a question arises as to what maximum temperature to which any particular portion of the ESP was exposed, all or a portion of the polymeric material adjacent the area(s) of interest are removed. These sample portions are then analyzed, as discussed below, at the wellbore location or they can be sent to a laboratory.

The physical change in the sample portions can be detected using Electrical Resistance Measurements, X-ray Diffraction, Polarized Light Analysis, and is definitely detected using methods that detect changes of state of a material. Such preferred methods include the well know methods of Dynamic Mechanical Thermal Analysis (DMTA), Dynamic Electrical Thermal Analysis (DETA), and most preferred, because of low cost and ease of operation, Differential Scanning Calorimetry (DSC). DSC uses the phenomena that when the temperature of any crystalline material is increased, additional discrete measurable units of energy per degree of temperature are required. This is referred to as the heat capacity of the material. When the temperature of a crystalline material is raised from a temperature below its melting point to a temperature above its melting point, an additional amount of energy is required to melt the crystals. This increase in energy is called the heat of fusion and represents a phase transition (i.e. solid to liquid) of the material. DSC is the most commonly used technique for measuring the heat of fusion and the melting point of crystalline polymeric material.

With DSC, a sample is placed in an aluminum sample pan, which is placed into a furnace together with an identical empty sample pan (the reference pan). The two pans are heated at a controlled rate, usually measured in degrees C/minute. The amount of energy necessary to increase the temperature of the sample pan and the reference pan are recorded, usually in Calories/second. The difference in the amount of energy required to heat each pan is the energy required to heat the sample itself. This is called the heat capacity of the sample and it is usually constant over a broad range of temperatures. When a transition, such as a melting point, is reached, the sample will require additional energy to maintain a constant heating rate. As the melting point of the sample is approached, the energy required will increase, and once the melting point is passed, the energy required will decrease. The resulting peak in the curve of recorded data points of Calories/second represents the melting point. The area under the curve of data points represents the heat of fusion of the sample.

Crystalline polyetheretherketone (PEEK) has been found to be very sensitive to heat exposure history. Specifically, when a sample of crystalline polyetheretherketone (PEEK) is exposed to a temperature above its glass transition temperature and below its melting point, microscopic crystals will form within the otherwise generally uniform crystalline structure. The size, shape and quantity of such microscopic crystals have been found to uniquely correspond to the maximum exposure temperature. These microscopic crystals have a lower melting point than the otherwise generally uniform crystalline structure, and as such cause a small but detectable peak in the curve of data points prior to the peak representative of the overall melting point.

The following tests were conducted to show the correlation between the maximum exposure temperature and the secondary peak found on the DSC graph. Six (6) samples of electrical wire coated with crystalline polyetheretherketone (PEEK) were held in a forced air oven at different temperatures for between 15 and 60 minutes each. Then, two (2) to four (4) mg samples of PEEK were taken from each of the wire samples and tested in the DSC. The results were as follows:

| Sample # | Exposure Temp. | Melting Peak Temp. | Exposure Time |
|---|---|---|---|
| 1 | 260 C. | 276 C. | 15 mins |
| 2 | 240 | 258 | 15 |
| 3 | 220 | 242 | 15 |
| 4 | 200 | 226 | 60 |
| 5 | 180 | 208 | 60 |
| 6 | 160 | — | 60 |

Figure 9:
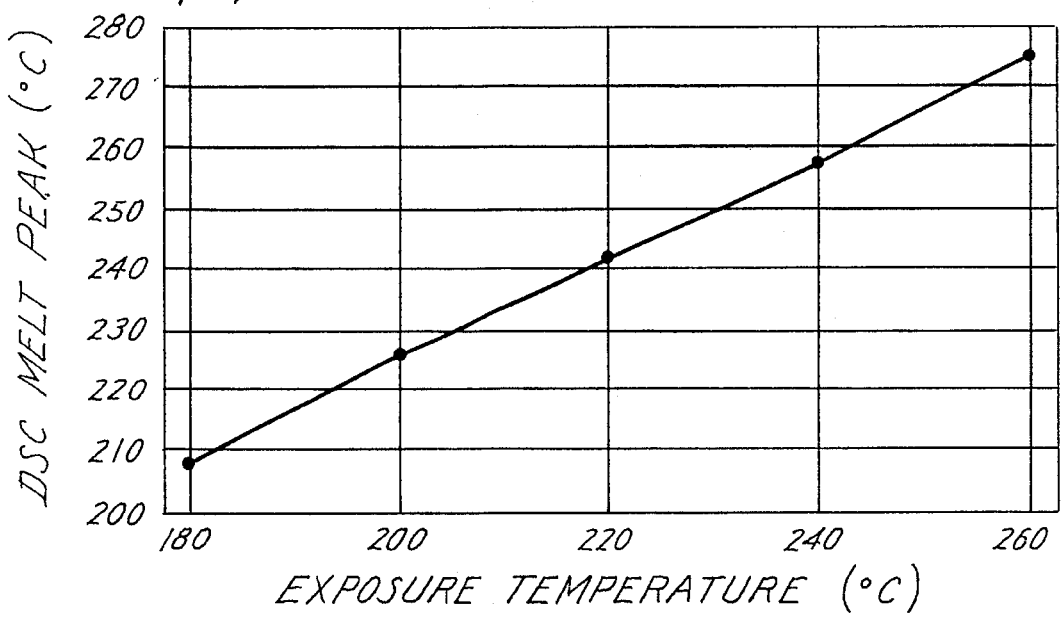

FIGS. 3–8 show the DSC curves obtained for each of the above samples. FIG. 9 shows that the relationship between the exposure temperature and the melting peak temperature is linear and follows the equation:

$$CMT=CF(ET)+AF$$

where:

CMT is the melting temperature of the unique crystalline structures in degrees C.

CF is a correlation factor between 0.80 and 0.95.

ET is the maximum exposure temperature in degrees C.

AF is an additive factor in degrees C between 44 and 55.

For the above test samples, CF was found to be 0.85, and AF was found to be 55 degrees C.

Additional tests were made to determine if the observed correlation varied significantly with time, temperature, and environment. The same above test procedure was used on seven (7) samples which were submerged in motor oil and then exposed to the forced air furnace. The following results were obtained:

| Sample # | Exposure Temp. | Melting Peak Temp. | Exposure Time |
|---|---|---|---|
| 1 | 260 C. | 281.5 C. | 3 hrs. |
| 2 | 240 | 263.0 | 3 |
| 3 | 220 | 244.8 | 4.5 |
| 4 | 200 | 226.8 | 4.5 |
| 5 | 180 | 208.5 | 3 |
| 6 | 160 | 190.1 | 3 |
| 7 | 200 | 230.8 | 17 |

Figure 10:
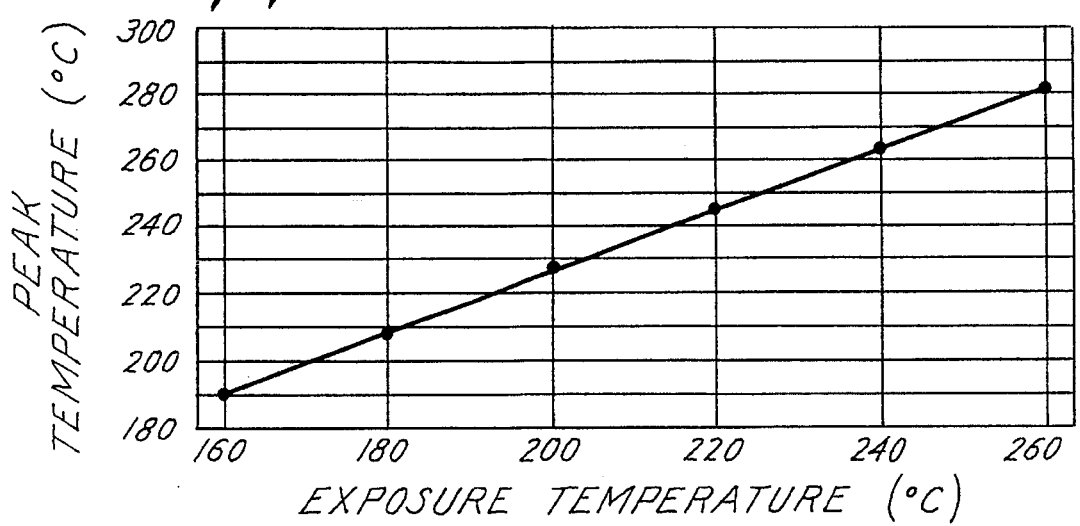
FIGS. 10 is a graph of the maximum temperature to which a body of polymeric material was exposed in an motor oil environment vs. melting temperature associated with the physical change of the polymeric material.

FIG. 10 shows that the relationship between the exposure temperature and the melting peak temperature is linear and follows the equation:

$$CMT=CF(ET)+AF$$

where:

CMT is the melting temperature of the unique crystalline structures in degrees C.

CF is a correlation factor between 0.80 and 0.95.

ET is the maximum exposure temperature in degrees C.

AF is an additive factor in degrees C between 44 and 55.

For the above test samples, CF was found to be 0.91, and AF was found to be 44.2 degrees C.

Whereas the present invention has been described in particular relation to the attached drawings and above described tests, it should be understood that other and further modifications, apart from those shown or suggested herein, may be made within the scope and spirit of the present invention.

What is claimed is:

1. A maximum temperature indicator comprising a body of polymeric material that undergoes a physical change that is not visually detectable, comprising the formation of crystalline structures having melting temperatures correlatable to a maximum temperture to which the polymeric material was exposed.

2. The maximum temperature indicator of claim 1 wherein the melting temperature of the crystalline structures is correlated to the maximum exposure temperature in accordance with the equation:

$$CMT=CF(ET)+AF$$

where:

CMT is the melting temperature of the unique crystalline structures in degrees C.;

CF is a correlation factor between 0.80 and 0.95;

ET is the maximum exposure temperature in degrees C.;

AF is an additive factor in degrees C between 44 and 55.

3. The maximum temperature indicator of claim 1 wherein the polymeric material is a polyketone.

4. The maximum temperature indicator of claim 3 wherein the polyketone is selected from the group consisting of polyethyleneterephthalate (PET), polyetherketone (PEK), polyetheretherketone (PEEK), polyetherketoneketone (PEKK), and polyetherketoneetherketoneketone (PEKEKK).

5. The maximum temperature indicator of claim 1 wherein the polymeric material is crystalline polyetheretherketone (PEEK).

6. A maximum temperature indicator comprising a body of polymeric material that undergoes a physical change that comprises the formation of crystalline structures having melting temperatures correlatable to the maximum temperature to which the polymeric material was exposed, the melting temperature of the crystalline structures is correlated to the maximum exposure temperature in accordance with the equation:

$$CMT=CF(ET)+AF$$

where:

CMT is the melting temperature of the unique crystalline structures in degrees C.;

CF is a correlation factor between 0.80 and 0.95;

ET is the maximum exposure temperature in degrees C.;

AF is an additive factor in degrees C between 44 and 55.

7. The maximum temperature indicator of claim 6 wherein the polymeric material is a polyketone.

8. The maximum temperature indicator of claim 7 wherein the polyketone is selected from the group consisting of polyethyleneterephthalate (PET), polyetherketone (PEK), polyetheretherketone (PEEK), polyetherketoneketone (PEKK), and polyetherketoneetherketoneketone (PEKEKK).

* * * * *